United States Patent Office 3,517,722
Patented June 30, 1970

3,517,722
WIRE CABLE-TO-RUBBER ADHESION
Norman G. Endter, Cuyahoga Falls, Charles N. Meier, Stow, and Lewis T. Lukich, Akron, Ohio, assignors to The Goodyear Tire & Rubber Company, Akron, Ohio, a corporation of Ohio
No Drawing. Filed Jan. 21, 1965, Ser. No. 427,168
Int. Cl. B60c 9/16; B29h 9/08; B32b 15/06
U.S. Cl. 152—359        10 Claims

ABSTRACT OF THE DISCLOSURE

Discloses rubber and wire reinforced rubber structures wherein the rubber is modified with a resin formed in situ from the reaction of a methylene acceptor such as resorcinol and a methylene donor reactable therewith. The donors include N-(substituted oxymethyl) derivatives of urea, N-(substituted oxymethyl) derivatives imidazolidine, N-(substituted oxymethyl) derivatives of hydantoin, N-(substituted oxymethyl) derivatives of melamine, an N-(substituted oxymethyl) carboxylic acid amide, an N-(substituted oxymethyl) cyclicimide, a 5 - substituted - 1-aza-3,7-dioxabicyclo[3.3.0] octane, a 5-substituted-1,3-di (substituted oxymethyl) hexahydrotriazin-2-one, trimeric methyleneamino acetonitrile, and an azomethine.

This invention relates to improvements in the method of adhering rubber to a metal surface and more particularly to bonding a brass or bronze coated wire to rubber, to the improved laminate so obtained and particularly to pneumatic tires reinforced with wire cable.

It is well known to use rubber in the manufacture of pressure hose, drive belts, and pneumatic tires, but when used in this manner it is necessary to reinforce the rubber with a reinforcing element. Textile material such as cotton, rayon, or nylon have been used but wire cord has been found to be more desirable under certain conditions of use especially in pneumatic tires and particularly in pneumatic truck tires. Maximum reinforcement of the rubber is obtained when maximum adhesion is produced between the laminate of rubber and reinforcing element to form a unitary structure. Equally important is the requirement that the laminate of the reinforcing element and rubber remain in bonded relationship with each other throughout the useful life of the structure in which the laminate is used. It is preferred that no separation occur between the surface of the wire and the rubber bonded thereto but under the severe conditions pneumatic truck tires are subjected to it becomes difficult to preserve more than about 25 to about 35% of the bond at the metal surface of the reinforcing wire cable.

It has now been discovered that at least 50% and as much as 100% of the bond at the metal surface of a bronze or brass coated wire will be preserved if a resin is formed in situ in the rubber and the in situ resin is formed from a methylene donor, capable of generating methylene groups in the presence of a methylene acceptor wherein the by-products of the resin-forming reaction are relatively inert toward the metal exposed to the rubber being bonded thereto.

It has been discovered that the methylene donors that are used in forming the in situ resin in the rubber being bonded to the wire reinforcing cable must contain at least one 3 valent nitrogen connected to at least one $CH_2$ radical. The remaining valence of the $CH_2$ radical is connected either to the same nitrogen to form a methyleneamino radical ($-N=CH_2$) or the remaining valence of the $CH_2$ radical is connected to an oxy radical ($-OX$) wherein X is a radical selected from the group consisting of hydrogen to form a methylol group ($-CH_2OH$), or a lower alkyl (1–8C) to form an alkoxymethyl group ($-CH_2OR$), or methylene ($-CH_2-$). The methylene ($-CH_2-$) radical may in turn be connected to other radicals in forming the desired compound that may be used as a methylene donor of this invention. When one of the nitrogen valences are satisfied by the $CH_2$ radical at least one of the two remaining valences of the nitrogen is connected to a carbon atom and the remaining valence may be connected to a carbon atom or hydrogen. When the two remaining valences are each connected to a separate carbon atom each in a separate radical they will form together with the nitrogen mentioned above and the $CH_2$ radical an N-(substituted oxymethyl) amide, or an N-(substituted oxymethyl) cyclicimide, or a 5-substituted-1-aza-3,7-dioxabicyclo [3.3.0] octane, or a 5-substituted-1,3-di(substituted oxymethyl) hexahydrotriazin-2-one, N-(substituted oxymethyl) derivatives of urea, including N-(substituted oxymethyl) imidazolidines, and N-(substituted oxymethyl) hydantoins, as well as derivatives of N-(substituted oxymethyl) melamines. One class of urea derivatives has the general formula

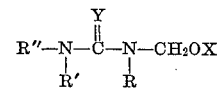

wherein Y is oxygen or sulfur, X is hydrogen or lower alkyl (1–8C) and R, R' and R'' are hydrogen, lower alkyl (1–8C) or $-CH_2OX$, but not more than two $-CH_2OX$ groups may be present in the compound, and not more than one $-CH_2OX$ may be present on any one nitrogen atom. Examples of these ureas are 1,3-dimethylol thiourea, 1,3-dimethylol urea, 1,3-dimethylol-1-methyl thiourea, 1,3 - dimethylol - 1,3-dimethyl urea, 1,3-dimethylol-1,3-dibutyl urea, 1,3-dimethylol-1,3-diisobutyl thiourea, and 1-methylol-1,3,3-trimethyl urea.

The imidazolidines, also known as cyclic ureas, have the general formula

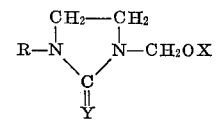

wherein Y is sulfur or oxygen, X is lower alkyl (1–8C) or hydrogen and R is lower alkyl (1–8C), hydrogen, or $-CH_2OX$. Examples of the N-(substituted oxymethyl) imidazolidines are 1,3-dimethylol-2-imidazolidinethione, 1,3-dimethylol-2-imidazolidinone, and 1-methylol-3-methyl-2-imidazolidinethione.

The hydantoins, also referred to as cyclic ureides, have the general formula:

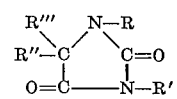

wherein R and R' are lower alkyl (1–8C) hydrogen and at least one being $-CH_2OX$ wherein X is hydrogen or lower alkyl (1–8C) and R'' and R''' are lower alkyl (1–8C), or hydrogen. Examples of these hydantoins are 1-methylol-5,5-dimethyl hydantoin, 3 - methylol - 5,5 - dimethylhydantoin, 1,3 - dimethylol-5,5-dimethylhydantoin, and 1-methylol-5,5-dibutylhydantoin.

The N-(substituted oxymethyl) melamine derivatives have the general formula:

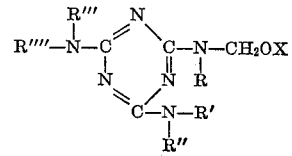

wherein X is hydrogen or lower alkyl (1–8C), R, R', R", R''', and R'''' are lower alkyl (1–8C), hydrogen or CH₂OX where X is hydrogen or lower alkyl (1–8C). Examples of these melamines are hexakis (methoxymethyl) melamine, N,N',N"-trimethyl-N,N',N"-trimethylolmelamine, hexamethylolmelamine, N,N',N"-trimethylolmelamine, N-methylolmelamine, N,N'-dimethylolmelamine, N,N',N"-triethyl-N,N',N"-tris(methoxymethyl)melamine, and N,N'N"-tributyl-N,N',N"-trimethylolmelamine.

The N-methylol derivatives of urea are made by reacting the parent urea with 2 mole equivalents of a 37% aqueous formaldehyde solution until the urea has dissolved in the solution during stirring, removing water and recovering the product. The N-methylol derivatives of imidazolidine and of hydantoin are prepared in the same manner described for the urea above with the exception that the parent urea is substituted with the parent imidazolidine and with the parent hydantoin. The N-methylol melamines are prepared by reacting the parent or base melamine with from 1 mole equivalent to 6 mole equivalents of 37% aqueous formaldehyde solution with stirring until the melamine has completed its reaction with the formaldehyde as evidenced by solvation of the melamine. Water is removed and the desired product recovered in a conventional manner.

When the nitrogen is connected to a CH₂ radical through a double bond to form an azomethine the remaining nitrogen valence is connected to a carbinyl radical to which each remaining valence is satisfied by carbon or the remaining nitrogen valence may be connected to a methylene group believed to be present when methyleneaminoacetonitrile is trimerized.

Sub-classes of methylene donors useful in this invention containing the substituted oxymethyl group (—CH₂OX) are those donors known as the 5-substituted-1-aza-3,7-dioxabicyclo [3.3.0] octanes having the general formula

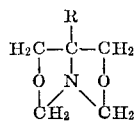

wherein R is a radical selected from the group consisting of hydrogen, lower alkyl (1–8C), and methylol (—CH₂OH)

These octanes may be prepared by reacting two moles of formaldehyde or paraformaldehyde with 1 mole of a 2-substituted-2-amino-1,3-propanediol. Thus in this type of compound each of two of the valences of the nitrogen is connected to a —CH₂OX grouping wherein X is a methylene group (—CH₂—). The third valence of the nitrogen is connected to a carbon in a radical which together with the N and the (—CH₂O—CH₂—) groups form the 5-substituted-1-aza-3,7-dioxabicyclo [3.3.0] octane. The formaldehyde or methylene producing radical being the CH₂ groups attached immediately to the nitrogen.

Another sub-class of methylene donors containing the substituted oxymethyl radical (—CH₂OX) are the amides wherein one of the valences of the nitrogen is connected to a carbonyl group

from a carboxylic acid which together with the substituted oxymethyl radical may be referred to as a substituted oxymethylcarboxamido group. The amides of this invention may more specifically be referred to as N-methylolamides of monocarboxylic acids when X is hydrogen. Specific examples of these amides are N-methylolacetamide, N-methylolbutyramide, N-methylolbenzamide. The remaining nitrogen valence may be connected to a lower alkyl radical (1–8C) or a substituted oxymethyl radical (—CH₂OX) where X may be a radical as defined for X above.

When the remaining valence of the nitrogen is connected to a second carbonyl

group, a cyclicimide is formed. Examples of the N-substituted oxymethyl cyclicimides of dicarboxylic acids useful in this invention where the substituent is hydrogen are N-methylolsuccinimide, N-methylolmaleimide, N-methylolitaconimide, N-methylolcitraconimide, N - methylolphthalimide, N-methylolhexahydrophthalimide, N-methylol-1,2,3,6-tetrahydrophthalimide, and N-methylol-3,6-endomethylene - Δ4 - tetrahydrophthalimide. The N-substituted oxymethyl) amides and the N-substituted oxymethyl) cyclicimides form in situ resins when heated in the presence of a methylene acceptor.

More specific =NCH₂OX types of donors useful in this invention are the 5-substituted-1,3-di(substituted oxymethyl) hexahydro-sym-triazin-2-ones, wherein the 5 substituent may be lower alkyl (1–8C) or cycloalkyl and wherein the substituent is the substituted oxymethyl radical (—CH₂OX) may be hydrogen, methyl and lower alkyl (2–8C). These triazin-2-ones are prepared by reacting a dimethyl urea with a primary amine, such as ethylamine and then reacting the product, triazone, with two moles of formaldehyde, under alkaline conditions.

Another class of compounds under the broad class of methylene donors useful in this invention are known as the azomethines having the general formula

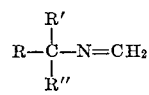

wherein R, R' and R" are lower alkyl (1–8C) radicals, phenyl, benzyl and 2-prenylethyl. Examples of these donors are t-butylazomethine, t,t-octylazomethine or neopentyldimethylcarbinylazomethine, alpha,alpha-dimethylbenzylazomethine, triphenylmethylazomethine or alpha, alpha-diphenylbenzylazomethine, tribenzylmethylazomethine, tri-(2-phenylethyl)methylazomethine.

Still another type of methylene donor is trimeric methyleneaminoacetonitrile made by reacting sodium cyanide and formaldehyde in the presence of ammonium chloride and which trimer may have the formula

The most important property exhibited by the methylene donors of this invention is the fact that the methylene donors do not degrade the metal surface of the wire cable particularly when the cable is embedded in the rubber and the laminate subjected to high temperatures for prolonged periods of time particularly under those conditions that prevail when the laminate is used in the construction of a pneumatic truck tire which when running at high speeds generate large amounts of heat highly detrimental to the bond at the metal to rubber interface.

The rubber component of the laminate of this invention may be any rubber that is a stretchable composition having a tendency to return to its approximate original shape after being vulcanized and particularly any rubber that is used in the manufacture of tires, drive belts or pressure hose. Thus the laminate of this invention may involve natural rubber otherwise known as Hevea Brasiliensis, or conjugated diene polymeric rubbers made by polymerizing butadiene-1,3, isoprene, 2,3-dimethyl butadiene-1,3, and mixtures of these conjugated dienes as well as copolymers of these diene monomers with up to 50% of compounds which contain a CH₂:C:group and which are copolymerizable with butadiene-1,3 where for example at least one of the valences is attached to an electro negative radical, that is a radical which increases the polar character of the molecule such a vinyl, phenyl, nitrile and carboxy radicals. Examples of the diene rubbers are polybutadiene, stereospecific polybutadienes particularly those having a cis-1,4 content of at least 90%, polyisoprene, stereospecific polyisoprenes especially those having a cis-1,4 content of at least 90%, butadiene/styrene copolymers, also known as SBR and butadiene/acrylonitrile copolymers also known as NBR.

The rubber being bonded to the wire elements in the presence of an in situ resin will contain conventional compounding and vulcanizing ingredients such as carbon black, anti-oxidants, sulphur, zinc oxide, accelerators, and rubber processing and softening oils which may be added as such or may be prepared from oil-extended rubbers.

The laminate of this invention is prepared by coating the rubber which has been compounded in accordance with the disclosure set forth above onto the wire elements in the usual manner. The reinforcing wire used in this invention is the conventional brass or bronze coated steel wire made in accordance with conventional and known methods for the brass and/or bronze coating of steel wire. A conventional way of producing steel wire that may be used as a reinforcing element in the production of a rubber structure is to first hot dip zinc coat the wire and then provide a copper plating over the zinc coat. A substantial coating of zinc is required to give adequate corrosion resistance for the steel core, and to provide a proper base for rubber adhesion, it is necessary to apply the copper coating over the zinc in a rather thin layer. However, the copper alone does not induce adequate adhesion of rubber thereto and it becomes necessary for the zinc to migrate to the copper thereby producing a brass coating which is known to provide a satisfactory surface for the bonding of rubber thereto. Brass alloys best suited for adhesion of rubber thereto will contain copper in an amount between 60% to 80% and zinc in an amount from 40% to 20%. A preferred brass coating for steel wire to be used as a reinforcing agent for a rubber construction is one containing 70% copper or 0.425 part zinc per part of copper. The thickness of copper which may be used to permit migration of zinc through the copper to produce the desired brass alloy at the surface, will be from about .000004″ to .000010″. Under these conditions, migration continues steadily until the copper/zinc reaches equilibrium for the amounts of the two metals which were originally placed upon the wire.

It is understood that the copper or zinc wire must be used within a certain length of time or the percentage of zinc at the outer surface will become too high for good rubber adhesion. The amount of brass may be expressed in terms of its weight per kilogram of wire. For example, on a .037″ steel wire the minimum zinc is 4 grams per kilogram of wire while the copper ranges from .5 to 1.3 grams per kilogram. Thus there are from 3 to 8 parts of zinc per part of copper.

Another method for brass coating conventional steel wire used as a reinforcing element in the construction of rubber articles involves the electro plating of a brass alloy upon the surface of the steel wire. The coating may contain between 50 and 95% copper and 5 to 50% of a metal of the class of zinc and tin. The preferred coating may contain from 65 to 75% copper and from 25 to 35% zinc. Following the electro deposition of the copper/zinc or copper/tin alloy, the wire is cold drawn preferably on a continuous wire drawing machine to reduce the cross section thereof by at least 10% and preferably to a gauge of about .0059″. This cold drawing compacts the brass coating and gives it a smooth continuous surface and further raises the tensile strength of the wire to between 250,000 and 425,000 lbs. per square inch. The wire so treated with the brass coating is then stranded containing a plurality of wires. For example, a wire cable may be identified as 5 x 7—.0058″ over 3 x 1+1 having 2 turns per inch of length in the S direction. This means that 38 strands of brass coated steel wire .0058″ in diameter are used to make up the cable wherein the core of the cable involves three wires twisted, around which is twisted seven cables of wire each cable being made up of five strands of wire in turn having been twisted. Over this twisted arrangement of wires is placed another wire known as a spiral wrap. If the cable involved is to be used in the breaker portion of a pneumatic tire, a typical construction is a 6 x 1—0.015″ over 3 x 1+1 having 1.43 turns per inch of length in the S direction. This means that the core of the cable is made up of three wires twisted which in turn is covered by six wires twisted to form the cable. The assembly then being spirally wrapped with a single wire.

The present invention is of particular value wherein a metal is present as the exterior coating of the reinforcing element being used in the rubber construction. For example, the invention is also applicable to fibrous glass, coated with metals and alloys of metals including lead, zinc, tin, copper, aluminum, silver, Wood's alloy, Rose's alloy and various other alloys such as zinc-titanium, lead-copper, lead-tin, aluminum-copper, aluminum-gold, aluminum-zinc, aluminum-tin, lead-antimony, cadmium-zinc, copper-cadmium, tin-indium, silver-tin, silver-zinc, copper-zinc, antimony-tin, antimony-zinc, copper-aluminum, Dow metal, brazing and soldering alloys and the like.

It has been observed that these metals are degraded or removed either in whole or in part from the surface of the glass fiber being coated thereby or from the surface of the steel wire being coated thereby under certain conditions of rubber compounding other than the compounding of the present invention. The removal through degradation is observed to take place through the chemicals used in the rubber and particularly the by-products of resin formation where it is important that a resin be formed in situ. This invention involves the use of resin-forming components that do not produce detrimental by-products. Each of the resin-forming components of this invention form a resin wherein the by-products of resin formation are inert toward the metal surface such as is on the steel wire or is on the glass fiber. As a result, the bond produced between the rubber and the metal coating on the reinforcing element is not destroyed even under severe heat conditions and as a result the unitary nature of the bond is preserved at the rubber to metal interface.

The following example illustrates the best mode in which the invention may be performed. All parts are by weight unless otherwise identified.

EXAMPLE 1

The wire tire cable used in this example is of a 5 x 7—.0058″ over 3 x 1+1 construction for use in making the plies of a pneumatic tire. The surface of each strand of steel wire was coated with brass (an alloy of 70% copper and 30% zinc ±5%) at the rate of 5.5 grams of brass per kilogram of steel ±1.5 grams.

The wire cable is treated with rubber made and compounded in accordance with the following formula:

| Ingredients | Parts by weight | |
| --- | --- | --- |
| | Amounts | Range |
| 1. Natural Rubber | 100 | |
| 2. Carbon Black (HAF) | 50 | 10-60 |
| 3. Zinc Oxide | 10 | 5-15 |
| 4. Stearic Acid | 2 | 1.5-3.0 |
| 5. Pine Tar | 10 | 5-15 |
| 6. Accelerator (Mercaptobenzothiazyl disulfide) | .5 | .1-3.0 |
| 7. Sulphur | 4 | 2-8 |
| 8. Wingstay 100 (mixture aryl-p-phenylenediamines) | 1.0 | .5-1.5 |
| 9. Methylene Acceptor (m-disubstituted benzene) | (¹) | 1-10 |
| 10. Methylene donor (=NCH²OX or R—N=CH² type compound, R being radicals of the type described herein) | (¹) | 1-10 |

¹ As noted.

In compounding the rubber stock in accordance with the formulation set forth above a master batch of ingredients 1,3 (7.0 phr.) and 9 are made with the carbon black in a mill at a temperature of about 110° C. The resulting carbon black master batch is then cooled and the remaining compounds including the remaining zinc oxide (3 phr.) are added to the batch in the order indicated above in a Banbury at a temperature of about 70° C. The control rubber was prepared in a similar manner except that a methylene acceptor and a methylene donor was not added.

The adhesion of the rubber compounds was measured at 200° F. after the cable was coated with the rubber compound being tested and the assembly vulcanized for 60 minutes at 310° F. The pounds necessary to pull the adhered cable free from the rubber is the adhesion value in pounds. Results that may be obtained are shown in the following table:

TABLE I

Wire cable embedded in rubber vulcanized at 310° F. for 60 minutes. All parts by weight.

| Examples | Acceptor | Parts, phr. | Donor | Parts, phr. | Adhesion, pounds per 1½″ of embedment | Wire surface covered by rubber, percent |
|---|---|---|---|---|---|---|
| 2 | None (control) | 0 | None | 0 | 109 | 10 |
| 3 | Res | 3.5 | HMTA | 3.0 | 173 | 29 |
| 4 | Res | 3.5 | MODO | 3.0 | 181 | 60 |
| 5 | Res | 3.5 | TBAM | 3.0 | 210 | 90 |
| 6 | Res | 3.5 | MIZO | 3.0 | 164 | 60 |
| 7 | Res | 3.5 | HKMM | 3.0 | 227 | 90 |
| 8 | Res | 3.5 | TTOA | 3.0 | 185 | 90 |
| 9 | MAP | 3.5 | HMTA | 3.0 | 178 | 20 |
| 10 | MAP | 3.5 | MODO | 3.0 | 214 | 95 |
| 11 | MAP | 3.5 | TBAM | 3.0 | 210 | 90 |
| 12 | MAP | 3.5 | MIZO | 3.0 | 180 | 100 |
| 13 | MAP | 3.5 | HKMM | 3.0 | 245 | 100 |
| 14 | MAP | 3.5 | TTOA | 3.0 | 160 | 90 |

HMTA = Hexamethylenetetramine.
MODO = 5-methylol-1-aza-3,7-dioxabicyclo [3.3.0] octane.
TBAM = N-t-butyl azomethine.
MIZO = 1,3-dimethylol-2-imidazolidinone.
HKMM = Hexakis (methoxymethyl) melamine.
TTOA = N-t, t-octyl azomethine.
Res = Resorcinol.
MAP = m-aminophenol.

In the table above it is to be observed that the percent wire surface covered by rubber after the wire was pulled free from the rubber varied from 10 to 100%, or from 90% to 0% loss of the bond between the rubber and the metal surface of the reinforcing element. Thus under the conditions of the control of Example 2 and using the donor of Examples 3 and 9 less than 30% of the bond at the rubber/metal interface was preserved. The present invention involving the formation of a resin in situ using =NCH₂OX and —N:CH₂ type of methylene donors insures that at least 50% and from 60 to 100% of the bond remains even when the rubber is excessively over-cured at 310° F. for 1 hour and even when the test is performed at 200° F. The wire cable identified above is embedded in a block of rubber 8 x 1½″ x ½″.

In the examples in the table above each of the methylene donors will produce an exceptional bond between the surface of the metal coated reinforcing element and more important is the fact that the rubber to metal bond is preserved even under servere conditions of over-cure of the rubber at values above 50% and even up to 100% which preservation is most unexpected in contrast to only 10% and at most less than 30% using other systems. It has also been observed that the methylene donors react favorably in the rubber to improve the physical properties of the rubber such as the 300% modulus, the ultimate tensile strength, the elongation, the hot rebound, the hot deflection and dynamic modulus. Of equal importance is the fact that these in situ resin formers are active at the same time the rubber is being converted to an irreversible condition all of which permits a proper cure of the rubber and a permanent and satisfactory bond to the metal surface all within a predetermined cure cycle.

It is believed that the methylene donor undergoes a reversible reaction in the presence of heat to produce methylene either as formaldehyde or as methylene radical, which in turn is nascently reactable with the methylene acceptor to produce a resinous matrix throughout the body of the rubber while at the same time promoting desirable adhesion between the surface of the metal and the rubber. In each instance the CH₂ group adjacent to nitrogen is the essential component which is generated under the heat of vulcanization to form the resinous matrix with the methylene acceptor.

By lower alkyl (1–8C) is meant alkyl radicals such as methyl, ethyl, propyl (n- and iso-), butyl (n-, sec-, iso-, and tert-), amyl (n-, sec-, iso-, and tert-), hexyl e.g. n - hexyl, sec - hexyl, 2,2 - dimethyl - 3 - butyl, 2,2 - dimethyl-4-butyl, 2,3 - dimethyl - 2 - butyl, 2 - methylpentyl, 2 - methyl-2 - pentyl, 3 - methyl - 1 - pentyl, 3-methyl-2-pentyl, etc., heptyl, e.g. n-heptyl, sec - heptyl, 2,3 - dimethyl-3-pentyl, 2,4-dimethyl - 2 - pentyl, 2,4-dimethyl - 3 - pentyl, 2,2,3-trimethyl-3-butyl, 3 - ethyl-2-pentyl, 2-methyl-2-hexyl, etc., octyl, e.g. n-octyl, 2-ethylhexyl and 2,2,4,4-tetramethylbutyl.

The rubber compositions containing the combination of methylene acceptors and donors of the type disclosed herein are particularly useful in the manufacture of wire reinforced pneumatic tires, wire reinforced pressure hose, and wire reinforced drive belts, wherein the rubber is subjected to severe forces of flex, pressure and heat to the extent that the rubber must be reinforced with steel wire or metal coated glass and the instant invention permits the use of these reinforcing agents which possess physical properties far superior to other reinforcing agents.

While certain representative embodiments and details have been shown for the purpose of illustrating the invention, it will be apparent to those skilled in this art that various changes and modifications may be made therein without departing from the spirit or scope of the invention.

What is claimed is:

1. A laminate of a reinforcing element having a metal surface and rubber bonded to said surface, the rubber containing prior to vulcanization a methylene donor and a methylene acceptor capable of reacting with the methylene donor during vulcanization of the rubber to form a resin in situ, the resin causing at least 50 percent of the rubber to remain adhered to the metal after being subjected to a standard stripping test, the methylene honor being selected from the group consisting of N-(substituted oxymethyl) derivatives of 1,3-imidazolidine-2-ones and 1,3-imidazolidine-2-thiones, N-(substituted oxymethyl) derivatives of hydantoin, N-(substituted oxymethyl) derivatives of melamine, an N-(substituted oxymethyl) carboxylic acid amide, an N-(substituted oxymethyl) cyclicimide, a 5-substituted-1-aza-3,7-dioxabicyclo [3.3.0] octane, trimeric methyleneamino acetonitrile, and an azomethine of the general formula

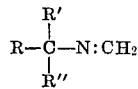

wherein R, R' and R" are lower alkyl (1–8C) radicals.

2. The laminate of claim 1 wherein the metal surface is brass.

3. In the method of adhering a metal coated reinforcing element to rubber by applying a vulcanizable rubber coating to said element and heating the assembly to vulcanize the rubber, the step which comprises incorporating in at least the portion of the assembly adjacent the interface of the element and rubber coating before vulcanization, a methylene donor and a methylene acceptor capable of reacting with the methylene donor, the methylene donor being selected from the group consisting of N-(substituted oxymethyl) derivatives of 1,3-imidazolidine-2-ones and 1,3-imidazolidine-2-thiones, N-(substituted oxymethyl) derivatives of hydantoin, N-(substituted oxymethyl) derivatives of melamine, an N-(substituted oxymethyl) carboxylic acid amide, an N-(substituted oxymethyl) cyclicimide, a 5-substituted-1-aza-3,7-dioxabicyclo [3.3.0] octane, trimeric methyleneamino acetonitrile, and an azomethine of the general formula

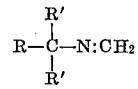

wherein R, R' and R" are lower alkyl (1–8C) radicals.

4. A laminate of an element made of a metal coated reinforcing element and a vulcanized rubber composition containing an in situ resin formed resinous reaction product of an m-disubstituted benzene wherein the substituents are selected from the group consisting of OH, NH$_2$ and —OCOCH$_3$ and a methylene donor being selected from the group consisting of N-(substituted oxymethyl) derivatives of 1,3-imidazolidine-2-ones and 1,3-imidazolidine-2-thiones, N-(substituted oxymethyl) derivatives of hydantoin, N-(substituted oxymethyl) derivatives of melamine, an N-(substituted oxymethyl) carboxylic acid amide, an N-(substituted oxymethyl) cyclicimide, a 5-substituted - 1 - aza - 3,7 - dioxabicyclo [3.3.0] octane trimeric methyleneamino acetonitrile, and an azomethine of the general formula

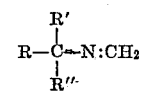

wherein R, R' and R" are lower alkyl (1–8C) radicals.

5. The laminate of claim 1 wherein the donor is an azomethine of the general formula

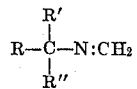

wherein R, R', and R" are lower alkyl (1–8C) radicals.

6. The laminate of claim 1 wherein the donor is 5-methyl-1-aza-3,7-dioxabicyclo [3.3.0] octane.

7. The laminate of claim 1 wherein the donor is 5-methylol-1-aza-3,7-dioxabicyclo [3.3.0] octane.

8. The laminate of claim 1 wherein the donor is t,t-octyl azomethine.

9. The laminate of claim 1 wherein the donor is N-t-butyl azomethine.

10. A pneumatic tire comprising a tread portion and an open-bellied, hollow, annular body comprising rubber reinforced with an element to form a laminate of the type of claim 1.

References Cited

UNITED STATES PATENTS

| | | | |
|---|---|---|---|
| 2,746,898 | 5/1956 | Buckwalter et al. | 161—241 |
| 3,226,276 | 12/1965 | Rye et al. | 156—335 |
| 2,417,975 | 3/1947 | Ebers. | |
| 2,442,083 | 5/1948 | Paul et al. | |
| 2,960,426 | 11/1960 | O'Mahoney | 161—215 X |
| 2,975,095 | 3/1961 | Bletso. | |
| 3,018,207 | 1/1962 | Danielson. | |
| 3,066,060 | 11/1962 | Gross | 161—215 |
| 3,097,109 | 7/1963 | Danielson | 117—162 |
| 3,097,110 | 7/1963 | Danielson | 117—162 |
| 3,097,111 | 7/1963 | Danielson | 117—162 |
| 3,194,294 | 7/1965 | Van Gils | 152—330 |
| 3,212,955 | 10/1965 | Kaizerman | 161—88 |
| 3,256,137 | 6/1966 | Danielson | 161—241 |
| 3,266,970 | 8/1966 | Paul | 161—241 |
| 3,281,311 | 10/1966 | Paul | 161—241 |

FOREIGN PATENTS 610,022   10/1948   Great Britain.

OTHER REFERENCES

Schildknecht, C. E., "Polymer Processes," Interscience Pub. Inc., New York, Feb. 28, 1956, pp. 338, 339.

JOHN T. GOOLKASIAN, Primary Examiner

C. B. COSBY, Assistant Examiner

U.S. Cl. X.R.

156—334, 335; 161—215, 216, 217, 241, 257; 260—3, 845, 846, 852